United States Patent Office

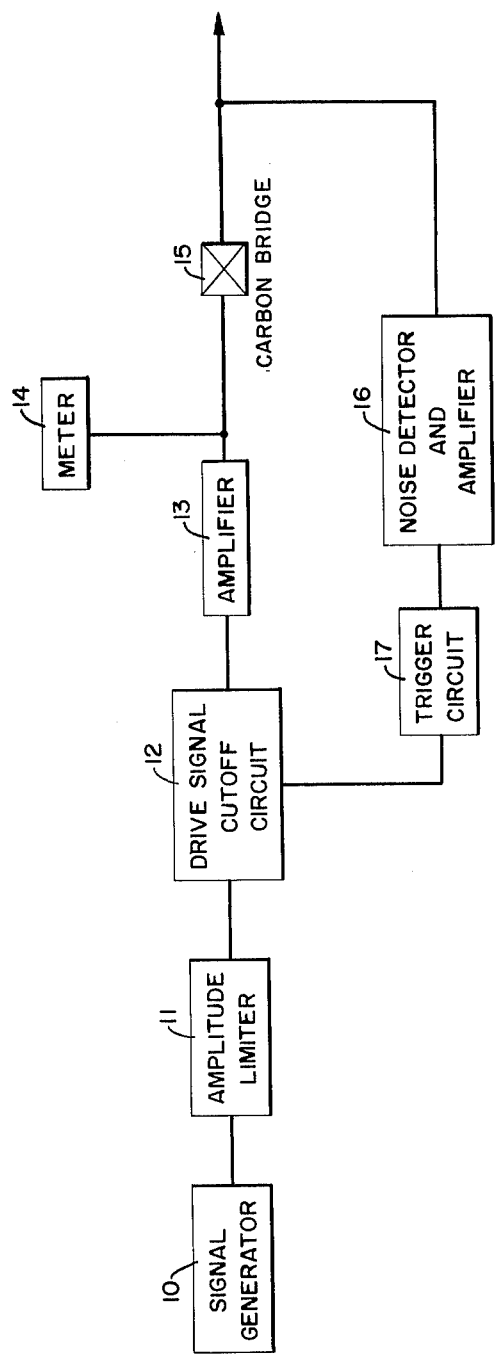

3,258,689
Patented June 28, 1966

3,258,689
PROCESS AND APPARATUS FOR SENSING THE ONSET OF RADICAL NOISE OF CARBON BRIDGE ELECTRO-EXPLOSIVE DEVICES BY UTILIZING DRIVE SIGNAL CUTOFF MEANS
David G. Ressler, Morristown, N.J., and James N. Ayres, Takoma Park, Md., assignors to the United States of America as represented by the Secretary of the Navy
Filed Aug. 29, 1963, Ser. No. 305,566
3 Claims. (Cl. 324—62)

The invention described herein may be manufactured and used by or for the Government of the United States of America for governmental purposes without the payment of any royalties thereon or therefor.

The present invention relates to processes and apparatus for testing electro-explosive devices, hereinafter referred to as EEDs, and more particularly to a method and apparatus for nondestructively testing the firing sensitivity of carbon bridge EED.

The carbon bridge EED comprises a thin film of graphite to conduct electrical energy and convert it into thermal energy adjacent to a sensitive explosive. When an electrical signal of sufficient strength is applied to the terminals leading to the graphite film, the explosive will be initiated. A problem long existing in the carbon bridge explosive art has been that of determining in detail the way the carbon bridge EED responds to various electrical signals and to provide some technique to predict, unit-by-unit, the point below which the EED would not be likely to fire and near or above which firing could be expected.

Heretofore, the sensitivity of groups of EEDs could not be predicted unit-by-unit. A sample of the group would have to be tested destructively, and by the use of statistical procedures an inference would have to be made as to the sensitivity of the remaining EEDs in the group. Any lack of validity of initial assumptions of EED representative sampling, any lack of knowledge of EED sensitivity distribution functions, or any discrepancy in the firing pulse wave applied to the EED could lead to such imprecise classification of EED sensitivity that a considerable risk would be involved in attempting to estimate the safety and/or reliability of a system using carbon bridge EED. The risk could be reduced only by extensive testing involving considerable expense.

The present invention contemplates the provision of an apparatus and method for testing carbon bridge EED individually and nondestructively by accurately predicting the firing energy necessary to initiate the explosive. Specifically, the novel and unique method hereindescribed for nondestructively testing a carbon bridge EED involves the application of a predetermined driving signal to the EED in the vicinity of the energy level normally required for firing the EED. Thereafter, by sensing the onset of radical noise in the EED due to the radical resistance variation when the driving signal reaches the current runaway or voltage limiting region of the carbon bridge, the driving signal energy required to fire said device can be determined. This determination is based on the fact that the point of onset of radical noise is closely correlated with the firing point of the EED. Thus by measuring the driving signal amplitude at or near the point of onset of radical noise and by interrupting the driving signal to prevent firing of said device where the point of onset precedes the point of firing, the sensitivity of each carbon bridge EED may be individually established.

An object of the invention is to provide a nondestructive method and apparatus for accurately determining the firing sensitiivty of individual carbon bridge EED.

A further object of the invention is to provide a method for testing carbon bridge EED to establish, unit-by-unit, the point below which the EED would not be likely to fire or near or above which firing could be expected.

A still further object of the present invention is to provide a method and apparatus for determining the firing sensitivity of carbon bridge EED through the use of known physical properties of the carbon bridge and in which conventional circuitry is employed and in which known monitoring techniques are used to determine the onset of radical noise in each carbon bridge EED.

Other objects and many of the attendant advantages of this invention will be readily appreciated as the same becomes better understood by reference to the following detailed description when considered in connection with the accompanying drawing wherein:

The single figure shown is a block circuit diagram of an apparatus suitable for practicing the method of the present invention.

There is shown at 10 a signal generator for applying a predictable driving signal to a carbon bridge EED 15. A half-sine wave or some other arbitrarily shaped wave form can be used as a driving signal. At the present time, however, the most useful driving signal has proved to be a ramp function which increases linearly with the time of application of the signal. It has been found convenient to use either of two general source impedances for the ramp driving function, for eaxmple, either a high impedance of 100,000 ohms or a low impedance of one ohm. The signal generator 10 is connected through an amplitude limiter 11 to a drive signal cutoff circuit 12. An amplifier 13 may be employed and interposed between the drive signal cutoff circuit 12 and the carbon bridge EED 15 to provide proper amplification of the ramp or sine wave function from signal generator 10. A meter 14 is conveniently connected to the output of the amplifier to record the amplitude of the driving signal required to fire the carbon bridge EED 15.

A manual voltage control has been used to fire a group of unloaded carbon bridges and a group of carbon bridges spotted with a standard lacquer explosive mixture. The current-voltage traces of the two groups recorded by an oscilloscope could not be distinguished, and it is assumed that the addition of the remaining explosive fill and the outer charge case usually applied to the above lacquer would have no effect on the bridge response. Any difference in volt-ampere traces between loaded and unloaded units must arise either from production batch-to-batch variation or to aging effects.

A feedback control circuit including a noise detector and amplifier 16 and a trigger circuit 17 is connected between the output of the carbon bridge EED 15 and one input of the drive signal cutoff circuit 12. Upon reception of a proper noise signal from the output of the carbon bridge EED 15, the feedback control circuit will be energized to provide a cutoff signal to the drive signal cutoff circuit 12 and thus open the circuit between amplifier 13 and amplitude limiter 11. Both the amplitude limiter 11 and the drive signal cutoff circuit 12 may have separate adjustable biasing means employed therewith to vary the limiting action of the amplitude limiter 11 and to vary the feedback signal level at which the drive signal cutoff circuit 12 will operate.

The carbon bridge EED resistance, as well known in the art, has a region of negative voltage coefficient resistance over a part of its current-voltage characteristic, and at some particular point on the characteristic there will be an onset of radical resistance variation associated with either current runaway or voltage limiting for the low and high signal source impedances respectively. The onset of radical resistance variation appears in the form of strong electrical noise at the output of EED 15 in comparison with the noise encountered below this level. Since there appears to be a high degree of correlation between this onset point and the point of firing of the carbon bridge EED, the relative sensitivities of the individually tested carbon bridge EED may be determined by correlating the point of firing with the point of onset of radical noise of each EED. The exact interrelation between the two points is not yet known and in some tests the firing of the EED will not occur until radical noise onset occurs. It may be that both points of onset and firing may be statistically distributed about the same or very close to the same mean points and in some cases the firing immediately precedes the onset point.

With regard to the effects that this testing procedure will have on the carbon bridge EED, it is noted that there are a great number of multiple paths in the carbon bridge through which power to the EED may flow. This is due to the random spacing of the carbon particles forming the carbon bridge EED, and when one path is disrupted others are available for current conduction. It is not yet known whether the point of onset is accompanied by significant damage to the carbon bridge, but it is assumed that the damage would not be significant if the signal can be interrupted as soon as the radical noise onset point is reached. The multiple paths apparently are not affected irreversibly below the onset point.

The technique of carrying out the novel testing procedure of the present invention in accordance with the single exemplary embodiment shown in the drawing is to apply a predetermined driving signal from the signal generator 10 to the carbon bridge EED 15. When the carbon bridge has been driven to the vicinity of its negative resistance region, the noise detector and amplifier 16 will sense an onset of radical noise from the output of EED 15 and trigger the circuit 17. The output of the trigger circuit 17 will be used to interrupt the drive signal by providing a cutoff voltage to the drive signal cutoff circuit 12. By employing a meter 14 to register the amplitude of the drive signal applied from the output of amplifier 13, the bridge sensitivity can be correlated with the maximum amplitude of the driving signal applied thereto.

Where the point of onset of radical noise precedes the EED firing point, it will be possible to sort loaded carbon bridge EEDs into groups of various intrinsic firing sensitivities. If the point of onset is closely correlated with the firing point but does not anticipate it, sorting would be carried out on unloaded units. This is true because the sorting would necessarily involve the initiation of most if not all of the loaded units. This latter sorting procedure, while not as clear cut as the procedure where the point of onset precedes the firing point, still permits classification of the carbon bridge EEDs into groups of various means sensitivities. During the process of manufacture it has been possible to alter the process parameters, for example, the grade of carbon used in the carbon bridge, so that the firing sensitivity of a production lot can be increased or decreased over that of the preceding group sorted.

Either solid state or vacuum tube circuitry may be employed in designing the well known electronic components of the block diagram circuitry shown in the drawing. The sensing of the onset of radical noise requires the use of a discriminating circuit 16 in order to distinguish between the input driving signal and the noise signal present in the output of the carbon bridge EED 15 once the onset point is reached. The discriminating circuit 16 of the present invention employed an A.C. coupled amplifier and a pulse transformer. However any other circuit combination which will differentiate the circuit once or twice or a circuit which will reject the frequencies of the drive signal while accepting the noise signal would work satisfactorily in place of the noise detector and amplifier 16 and the trigger circuit 17 in the feedback loop.

Obviously many modifications and variations of the present invention are possible in the light of the above teachings. It is therefore to be understood that within the scope of the appended claims, the invention may be practiced otherwise than as specifically described.

Having thus described the invention, what is claimed and desired to be secured by Letters Patent of the United States is:

1. A method for nondestructively testing the firing sensitivity of a carbon bridge electro-explosive device having a negative resistance region of its current voltage characteristic comprising the steps of applying a predetermined driving signal to said device, sensing the onset of radical noise in said device due to the radical resistance variation when said driving signal reaches the negative resistance region of the current voltage characteristic of said device, measuring the driving signal amplitude at said onset point of radical noise to establish the firing sensitivity of said device, and interrupting said driving signal at said onset point to prevent firing of said device while establishing the electrical firing sensitivity thereof.

2. Apparatus for nondestructively testing the firing sensitivity of a carbon bridge electro-explosive device comprising means for applying a predetermined driving signal to the input of said device, means coupled to the output of said device for sensing the onset of radical noise in said device due to the radical resistance variation when said driving signal reaches the negative resistance region of the current voltage characteristic of said device, discriminating means included within said sensing means for discriminating between a noise signal and said driving signal at the output of the carbon bridge electro-explosive device, means coupling said sensing means to said driving signal for interrupting said driving signal when a predetermined noise signal is received at said sensing means, and means coupled to said driving signal for measuring the amplitude thereof at said onset point of radical noise in said carbon bridge electro-explosive device.

3. The combination of claim 2 wherein said means for interrupting includes a drive signal cutoff means interposed between said means for applying a driving signal and said carbon bridge electro-explosive device, and means for applying said noise signal from said discriminating means to said drive signal cutoff means for terminating said driving signal at said point of onset of radical noise.

References Cited by the Examiner

UNITED STATES PATENTS

| 2,891,217 | 6/1959 | Grieg et al. | 324—57 |
|---|---|---|---|
| 3,134,073 | 5/1964 | Dickerson | 324—58 |

OTHER REFERENCES

Curtis: Electronics, "Noise-Performance in Tin Oxide Resistors," Nov. 10, 1961, pp. 100, 102, and 103.

WALTER L. CARLSON, *Primary Examiner.*

E. E. KUBASIEWICZ, *Assistant Examiner.*